United States Patent Office 3,526,624
Patented Sept. 1, 1970

3,526,624
PRODUCTION OF URETHANE-CONTAINING COMPOSITIONS
Perry A. Argabright, Brian L. Phillips, and Vernon J. Sinkey, Littleton, Colo., assignors to Marathon Oil Company, Findlay, Ohio, a corporation of Ohio
No Drawing. Filed Mar. 4, 1966, Ser. No. 531,772
Int. Cl. C07d 55/30; C07c 101/26, 101/30
U.S. Cl. 260—248
19 Claims

ABSTRACT OF THE DISCLOSURE

Urethane-containing compounds having molecular weights of at least about 200 are produced by reacting organic polyhalides with metal cyanates in the presence of monohydric alcohol and an aprotic solvent, with recovery of the polyurethanes thus formed.

The present invention relates to the production of urethane compositions and in particular relates to compositions containing urethane groups derived from organic dihalides by reaction with metal cyanates and monohydric alcohols in the presence of aprotic solvents.

Urethane compositions of the present invention are especially useful in coating formulations and particularly baked-on coating formulations. The urethanes of the present invention are especially preferred for formulation with active hydrogen-containing amine compounds, e.g., the Versamids produced by the General Mills Company. Such formulations can produce coatings which when cured contain the very resistant isocyanurate, polyamide and urea groups.

The present invention permits the production of new urethanes in which the nitrogen of the urethane radical $$-\underset{|}{\overset{H}{N}}-\underset{}{\overset{O}{\overset{\|}{C}}}-O-$$

is not attached to an aromatic ring. Furthermore, the present invention permits the production of urethanes which are derived from relatively unreactive hydroxyl compounds such as secondary or tertiary alcohols. In addition, the present invention permits the production of urethane compositions which automatically contain at least about 0.1 and preferably from 1 to 50 mole percent, based on the moles of nitrogen in the composition, of isocyanurate groups which impart desirable properties to the finished coating.

In addition to the superior quality of the finished films produced by the present invention, the invention offers two distinct economic advantages. These are:

(a) the production of the urethanes is accomplished in a single step reaction which minimizes the operating costs, the required equipment, and related capital investment; and (b) the invention makes possible the use of dihalides in place of the considerably more expensive diisocyanates which have been conventionally employed as starting materials for preparing blocked diisocyanates.

The compositions of the present invention are preferably prepared by the reaction according to the following general equation:

$$RX_a + bR'OH + aMOCN \xrightarrow[\text{catalyst}]{\text{aprotic solvent}}$$

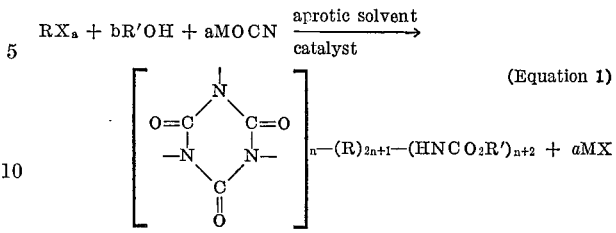

(Equation 1)

where R is a polyvalent radical which is noninterfering (with the reactions of the present invention) preferably selected from the following: alkylene, aralkylene, dehydroalkylene, polymeric radicals and their noninterfering substituted derivatives; more preferably

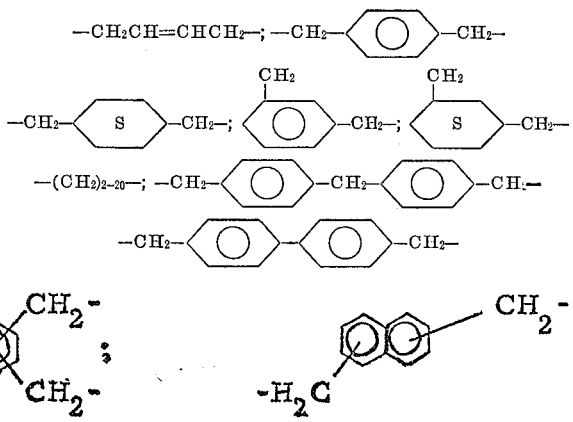

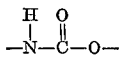

R preferably contains from 2 to about 100 carbon atoms, most preferably from 4 to about 20 carbon atoms. Particularly preferred are Rs which are unsaturated in such positions as to render the halogen allylic or benzylic;

where X is a halogen such as Cl, Br, and I, most preferably Cl and Br;

where R' is a noninterfering hydrocarbon radical preferably alkyl but may be unsaturated such as alkenyl, alkynyl, aryl, aralkyl, or a substituted derivative thereof which is noninterfering with the reaction of the present invention; preferably containing from 1 to 10 and most preferably from 2 to about 6 carbons, most preferably tert-butyl, sec-butyl, iso-propyl, tert-amyl, and sec-amyl;

where the OH groups in the compound, R'OH, may be primary, secondary, tertiary, or phenolic with secondary and tertiary hydroxy groups being preferred;

where $a$ is an integer of from 2 to about 40 and preferably from 2 to about 20; and where M is a metal (metal like as used herein includes metals and those cations which for the purposes of the present invention act as metals) preferably Li, Na, K, Rb, Cs, Ag, Pb, pyridinium, ammonium, or substituted ammonium, e.g., tetraalkyl ammonium radicals.

The mole ratio of hydroxyl groups to X groups will preferably be from 1 to about 20 and most preferably from 1 to about 6. The mole ratio of NCO groups to X groups will preferably be from 1 to about 5 and most preferably from 1 to about 2.

The reactions of the present invention are preferably run in aprotic solvents. By aprotic solvents is meant herein compositions which are liquid under the conditions of the reaction, which have a high dielectric constant (greater than about 15 at 25° C.), which are dipolar, that is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogen atoms capable of hydrogen bonding with or transferring to anions in solution in the reaction mixture. The aprotic solvent can be composed of a mixture of liquids so long as the overall liquid compositions meet the above criteria. Preferred among the aprotic solvents are N-alkyl pyrrolidones, dialkylformamides (e.g., dimethylformamide), N,N-dimethylacetamide, acetonitrile, N-methylpyrrolidone, hexamethylphosphoramide, and tetramethylurea, especially those in which the alkyl groups are methyl groups. The most preferred solvent for the reaction of the present invention is dimethylformamide. Preferably from about 10 to about 100 and most preferably from about 25 to about 50 moles of the solvent will be present for each mole of dihalide starting material.

The most preferred starting materials for the present invention are: the hydroxy compounds, $(CH_3)_2CHOH$, $CH_3CH(OH)CH_2CH_3$, $(CH_3)_3COH$, $CH_3CH(OH)CH_2CH_2CH_3$, $(CH_3CH_2)_2CHOH$, $(CH_3)_2C(OH)CH_2CH_3$,

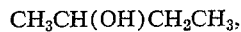

or combinations thereof and their noninterfering substituted derivatives; the organic dihalides, 1,4-dichloro-2-butene, α,α'-dichloro-m-xylene, α,α'-dichloro-p-xylene, and p,p'-di(chloromethyl)-diphenyl or combinations thereof and their noninterfering substituted derivatives.

While not absolutely essential to the reaction of the present invention, a catalyst will be preferred. The most preferred catalysts are organo tin catalysts such as dibutyl tin dilaurate, dibutyl tin di-2-ethylhexoate, dibutyl tin diacetate, dibutyl tin oxide, dibutyl tin dichloride, and dibutyl tin dioleate with the first three being most preferred. The catalyst is preferably present in concentrations from 0.1 to about 30 and most preferably from 0.5 to about 10.0 mole percent based on the replaceable halogen in the organic dihalide.

The temperature of the reaction of the present invention will preferably be from 25° C. to about 250° C. and most preferably from 75° C. to about 125° C. Pressure, while not narrowly critical, will preferably be from 0 to about 50 and most preferably from approximately 0 to about 10 p.s.i.g. The reaction may be readily carried out in conventional equipment preferably in a tight-lid type of resin cooking vessel with provision for the dropwise addition of the halogen-containing reactant when required.

The preferred urethanes of the present invention are those having molecular weights of at least about 200 and more preferably those having molecular weights of at least about 300.

While the present invention is directed toward the preparation of isocyanurate-containing blocked polyisocyanates, this invention can also be applied to the preparation of blocked diisocyanates containing no isocyanurate groups. Specifically, compounds A and B can be prepared from the corresponding dichlorides in accordance with Equation 1:

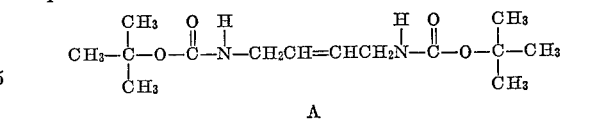

A

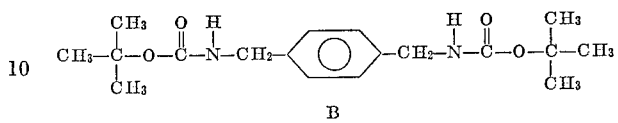

B

Agitation during the reaction is preferred. Reaction times will range from about 5 minutes to about 50 hours, and will preferably be from about 30 minutes to about 24 hours, but are not narrowly critical.

The purification of the reaction product will in most instances require only filtration to remove insoluble materials, e.g., salts, distillation preferably under vacuum to remove the aprotic solvent in which the reaction was carried out, and a wash preferably with water followed by drying in a warm oven. If compounds A and B (the nonisocyanurate-containing compounds discussed above) are to be recovered separately, this may be conveniently accomplished by extracting the product mixture with a solvent in which the desired compounds are soluble, e.g., cyclohexane.

All the above blocked isocyanate reaction products are preferably further reacted with active hydrogen compounds in which the active hydrogen is directly attached to a nitrogen, e.g., amines and polyamines, in order to form heat-curable polyurea-type coatings formulations.

The preferred amine-type compounds will include the simple polyamines, hexamethylene diamine, decamethylene diamine, etc., the polyamine containing prepolymers, e.g., Versamids, preferably those having molecular weights from about 100 to 2,000. Especially preferred among active hydrogen compounds are the amine-type resins sold under the tradename Versamid by the General Mills Company, Chemical Division, Kankakee, Ill.

Hydroxyl-type active hydrogen containing compounds (polyols) while conventionally employed with a wide variety of isocyanates in the preparation of urethane formulations are not, in general, preferred for formulating such compositions from the blocked isocyanates of the present invention. However, an important exception exists in the case of some of the tert-alcohol blocked isocyanates of the invention, especially the tert-butyl blocked. These react with polyols to form especially useful polymer-producing formulations having outstanding clarity and hardness.

In general, the overall reaction of these tert-butyl blocked isocyanates with polyols can be summarized as follows:

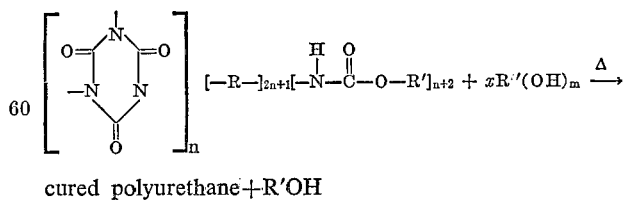

cured polyurethane $+R'OH$ where $n$=a whole number corresponding to the number of isocyanurate rings; $2n+1$=number of hydrocarbon groups (or noninterfering derivatives thereof) which bear either urethane or isocyanurate groups; $n+2$=number of blocked isocyanate groups (urethane); $m$=number of hydroxyl groups in the polyol; $x$=moles of polyol per mole of isocyanurate containing blocked isocyanate; thus for

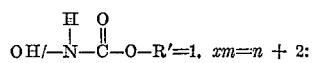, $xm=n+2$:

R=divalent hydrocarbon group; R'=sec or tertiary alkyl group; R" is a polyvalent prepolymer which may contain recurring ester, urethane, urea or ether groups or combinations thereof.

For the purpose of coating application, the two components (polyol and blocked polyisocyanate) are combined in proportions such that the

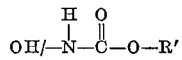

ratio is in the range 0.5 to 1.5 (preferably 0.8–1.2 and 0.9 to about 1.1 being optimum). A solvent such as cresol, Cellosolve, Cellosolve acetate, xylene, ketones, etc., may be employed to bring about solution. The nonvolatile content (polyol+blocked isocyanate) may be from 25 to 70% by weight depending on the magnitude of $n$, solvent employed, and viscosity desired.

Examples XIX through XXIV illustrate this important preferred embodiment of the present invention and demonstrate the especially desirable qualities in the finished coatings thus produced.

In general, in the preparation of the blocked isocyanate active hydrogen compound formulations, the general techniques of coating and other polymer formulations can be employed.

In general, the conventional techniques in preparing other polymeric formulations may be employed in making up formulations containing the new urethanes of the present invention. For example, the mole ratios of active hydrogens to urethane groups in the compositions will preferably be from 0.3 to about 10 and most preferably from 0.5 to about 3 but may be varied according to conventional techniques in order to give desired properties in the finished cured polymer. Where coatings formulations are desired, the active hydrogen compound and the urethane mixture may be diluted with conventional solvents, e.g., Cellosolve (2-ethoxy-ethanol) manufactured by Matheson Company; cresols, ketones, e.g., cyclohexanone and methylisoamyl ketone; benzene, heptane or ethylacetate. Curing catalysts (e.g., "Vulcacite 576" manufactured by Farbenfabriken Bayer consisting of a reaction product of acrolein with aromatic bases) may be used to reduce curing temperature.

The coating may be conventionally applied by spraying, rolling, brushing, flow-coating, or other means. Curing will in most cases be accomplished by heating in an oven, preferably at from 100 to about 800° C. and more preferably from 150 to 250° C. for a curing time of preferably from 5 to about 60 and most preferably from 15 to about 45 minutes, depending on the temperature employed.

It will be seen that the new urethanes of the present invention permit the low cost production of a wide variety of polymeric formulations which may be adapted according to conventional techniques. The examples which follow are, therefore, intended to illustrate the invention and are not to be taken as limiting the invention in any manner. All of the apparent modifications and variations of the invention are to be considered as being included within the claims appended hereto.

In the examples which follow, the testing procedures are as set forth below:

The panels are steel or tin plated steel as identified in the examples generally 0.032 inch thick.

By draw down is meant that the films are drawn down with a conventional Gardner applicator to the indicated film thickness.

The film thicknesses are measured by a Gardner Elcometer manufactured by Gardner Laboratories, Inc., Bethesda, Md.

Sward hardness was in all cases measured conventionally by a Sward hardness rocker, Model C manufactured by Gardner Laboratory, Inc., Bethesda, Md.

Flexibility was measured by bending the panel around a mandrel having the diameter indicated in each of the examples and "passed" means that the coating showed no noticeable fracturing or other failure after being so bent.

Impact, forward and reverse, indicates that the coating was impacted with the indicated inch pounds without failure, and that the panel was then turned over and the reverse of the panel was impacted in a different area, without failure of the coating. The impacting apparatus was that manufactured by the Gardner Laboratory, Inc., modified to provide a maximum of 120 inch-pounds of impact.

Gloss was measured by a Gardner portable 60° gloss meter.

"Modified" ASTM Color was measured with a Fisher ASTM Colorimeter (ASTM D–1500) by inserting the Gardner viscosity tube containing the formulated experimental oil into the colorimeter light beam and taking the reading as usual.

In general, commercial grades of starting materials will be satisfactory for the reactions of the present invention, but anhydrous starting materials (containing less than about 1% and preferably less than about 0.5% by weight of water) will be preferred.

EXAMPLE I

The apparatus used in this and all of the following examples for the preparation of isocyanurate based urethanes comprises a 3-necked round bottom glass reactor equipped with paddle type stirrer, reflux condensor (terminated with an adapter to maintain a nitrogen atmosphere in reactor), thermometer and thermoregulator. The reactor is heated by means of a mantle.

The reactor is charged with 61 g. (0.75 mole) KNCO, 95 ml. (1.00 mole) tert-butanol, 3.15 g. (0.005 mole) dibutyltin dilaurate (DBTL), and 250 ml. of dry dimethylformamide (freshly distilled) and the resulting slurry heated to 100° C. To the vigorously stirred slurry is added 31.25 g. (0.25 mole) of 1,4-dichlorobutene-2 over a period of 6 hours. The reaction mixture is heated an additional 14 hours at 100° C. After cooling to room temperature, the reaction mixture is filtered to remove the insoluble inorganic phase. The filtrate is added to 1 liter of water to precipitate the resinous product crude weight, 63.2 g. The presence of more than 0.1% (by weight based on the weight of $N_2$ in the molecule) of:

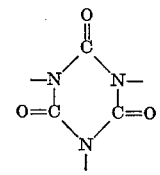

and more than 20% tert-butyl urethane

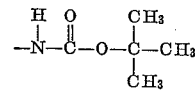

groups in the product is shown by nuclear magnetic resonance and infrared spectroscopy.

A portion (15 g.) of the resin is extracted exhaustively with hot cyclohexane to give 2.7 g. of tert-butanol blocked 1,4-diisocyanate butene-2(A) a new composition of matter, M.P. 118–119.5° C.

(A)
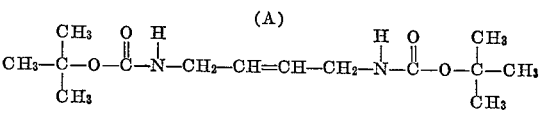

Analysis.—Calcd. for $C_{14}H_{26}N_2O_4$ (percent): C, 58.71; H, 9.15; N, 9.78; O, 22.35; mol wt., 286. Found (percent): C, 58.73; H, 9.00; N, 9.66; O, 22.47; Mol wt., 279.

The unextracted product as well as A can be used in the preparation of baked-on coatings. For example, a solution composed of 2.86 g. A and 3.33 g. Versamid-115 in 12 g. Cellosolve is applied to a metal surface and baked at 170° C. for 20 minutes to give a clear glossy coating having high hardness, good adhesion and flexibility.

EXAMPLES II–IV

As shown in the following table, the yield of diurethane A is a function of the catalyst concentration. The reactions were conducted under conditions identical to those in Example I.

|  | Mole percent [1] DBTL | Yield A [2] percent |
| --- | --- | --- |
| Example II | 0 | [3] 0 |
| Example III | 4.0 | 33.6 |
| Example IV | 10.0 | 37.2 |

[1] Mole DBTL per mole 1,4-dichlorobutene-2(×100).
[2] Isolated yield of diurethane A based on 100% conversion of 1,4-dichlorobutene-2.
[3] Only isocyanurate containing products isolated.

EXAMPLE V

A mixture composed of 17.5 g. (0.100 mole) α,α'-dichloro-p-xylene, 29.6 g. (0.40 mole) tert-butanol, 2.52 g. (0.004 mole) dibutyl tin dilaurate (DBTL), 24.3 g. (0.30 mole) KNCO and 100 ml. dimethylformamide (DMF) is heated at 100° C. for 18 hours with vigorous stirring under a nitrogen atmosphere. After cooling to room temperature, the reaction mixture is poured into 500 ml. of water. The solid precipitate is collected by filtration, re-extracted with additional water with good mixing (Waring Blendor) and dried to yield 29.0 g. of product. A portion of this material was extracted with cyclohexane and the cyclohexane soluble solid recrystallized from benzene to give colorless crystals of the tert-butanol blocked p-xylene diisocyanate (B), M.P. 148–150° C., a new composition of matter.

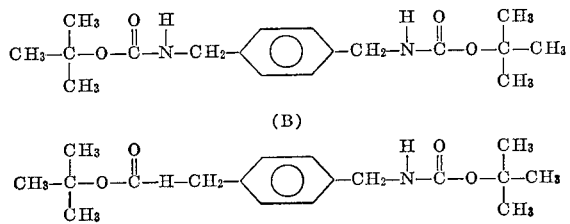

(B)

The elemental analysis of the crude product and diurethane B are gvien below:

|  | Crude | B | Calculated for $C_{18}H_{28}N_2O_4$ |
| --- | --- | --- | --- |
| Percent C | 63.57 | 64.28 | 64.30 |
| Percent H | 7.87 | 8.46 | 8.34 |
| Percent N | 8.98 | 8.32 | 8.34 |
| Mol. wt. | 513 | 340 | 336 |

The structure of (B) was confirmed by nuclear magnetic resonance (NMR) and infrared spectroscopy (IR). The presence of isocyanaurate rings and tert-butyl urethane groups in the unextracted product was demonstrated by IR and NMR.

EXAMPLES VI–VIII

The yield of crude product is a function of catalyst concentration as shown by the following examples conducted as in Example V.

|  | Time (hrs.) | Temp., °C. | Mole percent Cat. | Yield percent [1] |
| --- | --- | --- | --- | --- |
| Example VI | 24 | 100 | 4 | 94.4 |
| Example VII | 24 | 100 | 2 | 86.5 |
| Example VIII | [2] 6 | 100 | 0 | 71.0 |

[1] Isolated yield based on 100% conversion to diurethane.
[2] Reaction mixture gelled after 6 hours.

EXAMPLES IX–XII

The length of the reaction period also has an effect on the yield of crude product as shown in the following examples. The reactions were carried out conducted as in Example V using 4 mole percent dibutyl tin dilaurate as catalyst.

|  | Time (hrs.) | Yield percent [1] |
| --- | --- | --- |
| Example IX | 24 | 94.4 |
| Example X | 18 | 86.2 |
| Example XI | [2] 5 | 77.5 |
| Example XII | [2] 4 | 62.0 |

[1] Based on 100% yield to diurethane.
[2] Dropwise addition of α,α'-dichloro-p-xylene.

EXAMPLE XIII

Sodium cyanate can be used in place of potassium cyanate as shown by the following example.

71.50 g. of NaNCO (1.10 mole) is mixed with 92.50 g. of t-butanol (1.25 mole) and 6.31 g. of dibutyl tin dilaurate (2 mole percent) in 200 ml. of DMF. The temperature is raised to 100° C. and 87.5 g. (0.50 mole) of α,α'-dichloro-p-xylene dissolved in 112 ml. of DMF is added dropwise over a two-hour period.

Following the addition, the mixture is stirred for another two hours at 100° C. under a nitrogen atmosphere. After cooling, the reaction mixture is poured into 2,000 ml. of water. The solid precipitate is collected by filtration and dried to yield 87.0 g. (51.8% based on diurethane).

EXAMPLE XIV

The crude reaction products from the above examples can be used in the preparation of baked-on coatings. For example, 10 g. of the crude product from Example VII is dissolved in 40 g. of warm Cellosolve and filtered through celite filter media. 10 g. of Versamid 115 (amine value 238) is then mixed in and the warm solution applied to a metal surface and baked at 170° C. for 15 minutes giving the following properties:

Sward hardness—48
Reverse impact—pass 120 in lbs.
Forward impact—pass 120 in lbs.
Mandrel—pass ¼ in.

EXAMPLE XV

When using Versamid 125 (amine value 345) in place of Versamid 115 under identical conditions as Example XIV, a coating is obtained having the following properties:

| Sward hardness | Reverse impact | Forward impact | Mandrel | Solvent [1] resistance | Electrical resistance (v.) [2] |
| --- | --- | --- | --- | --- | --- |
| 44 | Passed 120 in. lb. | Passed 120 in. lb. | Passed ¼ in. | 5% HCl, blisters; 5% NaOH, no effect; acetone, softens; ethyl acetate, softens; benzene, no effect; heptane, no effect. | 2,000 |

[1] Portions of the coating placed in the solvent to be tested for 24 hours.
[2] Amount of voltage required to make coating (1.3 mil thick) conduct.

EXAMPLE XVI

Increasing the baking time increases the hardness of the coating without affecting its other properties.

| Example | Bake time (min.) | Sward hardness | Reserve impact | Forward impact | Mandrel | Solvent resistance |
|---|---|---|---|---|---|---|
| XVI | 15 | 44 | Pass 120 in. lb | Pass 120 in. lb | Pass ¼" | Same as Example XV. |
|  | 30 | 52 | ....do | do | do | Do. |
|  | 45 | 53 | ....do | do | do | Do. |
|  | 60 | 56 | ....do | do | do | Do. |

These tests were made from an identical coating solution as Example V and baked at 170° C.

From the above examples, it is clearly apparent that our crude reaction products containing both tert-butyl urethane groups and isocyanurate rings are advantageous for use in wire coatings when cured with a polyamine such as Versamid. It is also apparent that the coatings thus formed have properties equal or superior to those currently being marketed.

EXAMPLE XVII

When ethanol is used as the blocking agent in place of t-butanol, a product is obtained which may also be used in the preparation of wire coatings.

A mixture composed of 87.50 g. (0.50 mole), α,α'-dichloro-p-xylene, 71.50 g. NaCO (1.10 mole), 92.50 g. of ethanol (1.25 mole), 6.31 g. dibutyl tin dilaurate (2 mole percent) and 312 g. dimethylformamide is heated to 100° C. for 4 hours with vigorous stirring under a nitrogen atmosphere. After cooling, the reaction mixture is decanted into water. The solid precipitate collected by filtration and dried to yield 96.5 g. of white solid (69% yield based on 100% conversion to diurethane). The presence of isocyanurate rings and ethyl urethane groups is demonstrated by NMR and IR spectroscopy.

EXAMPLE XVIII

The crude product from the above example may be used in the formulation of wire coatings as demonstrated below:

5 g. of crude product from Example XII containing both isocyanurate rings and ethyl urethane groups is dissolved in Cellosolve at 70° C. and filtered. 5 g. of Versamid-125 is then mixed in. After some time, solids settle out of solution but can be brought back into solution by heating to 50–70° C. The solution is then applied to a metal surface and baked at 170° C. for 30 minutes. The resulting coating has the following properties.

| Sward hardness | Reverse impact | Forward impact | Mandrel | Solvent resistance [1] | Electrical resistance (v.) [2] |
|---|---|---|---|---|---|
| 54 | Passed 120 in. lb | Passed 120 in. lb | Passed ¼ in | 5% HCl, blisters; 5% NaOH, no effect; acetone, softens; ethyl acetate, softens; benzene, no effect; heptane, no effect. | 2,000 |

[1] Portions of the coating placed in the solvent to be tested for 24 hours.
[2] Amount of voltage required to make coating (1.3 mil thick) conduct.

Examples XVII and VIII clearly demonstrate that ethanol may be used as the blocking agent in place of t-butanol to form a product containing isocyanurate rings as well as ethyl urethane groups. It is also demonstrated that this crude product when cured with a polyamine such as Versamid is advantageous for use in the formulation of wire coatings having excellent properties.

As shown in Examples XIX and XX, the dichloride may be added batchwise to the reaction mixture at 100° C.

EXAMPLE XIX 16.50 g. NaNCO (0.25 mole) is mixed with 14.80 g. of tert-butanol (0.20 mole) and 1.26 g. of dibutyl tin dilaurate (2 mole percent) in 100 ml. of DMF. The mixture is heated to 100° C. under a nitrogen atmosphere and 17.50 g. of α,α'-dichloro-p-xylene (0.10 mole) dissolved in 100 ml. of DMF is added immediately. The mixture is then stirred vigorously at 100° C. for 8 hours under a nitrogen atmosphere. After cooling to room temperature, the reaction mixture is filtered. The filtrate is then poured into 2,000 ml. of water. The precipitate formed is filtered and dried yielding 23.20 g. of isocyanurate containing tert-butyl blocked polyisocyanate as shown by IR and NMR spectra.

EXAMPLE XX 17.80 g. of KNCO (0.22 mole) is mixed with 14.80 g. of t-butanol (0.20 mole) and 0.631 g. of dibutyl tin dilaurate (1 mole percent) in 100 ml. of DMF. The mixture is heated to 100° C. under a nitrogen atmosphere and 17.50 g. of α,α'-dichloro-p-xylene (0.10 mole) dissolved in 100 ml. of DMF is added immediately. The mixture is then stirred vigorously at 100° C. for 8 hours under a nitrogen atmosphere. After cooling to room temperature, the reaction mixture is filtered. The filtrate is then poured into 2,000 ml. of water. The precipitate formed is filtered and dried yielding 25.40 g. of isocyanurate containing tert-butyl blocked polyisocyanate as shown by IR and NMR spectra.

EXAMPLE XXI 5 g. of crude product from Example I is dissolved in 10 g. of xylene at 70° C. and 10 g. of a 50% solution of Multron R-2 (polyester with a hydroxyl number of 390–420) is mixed in. The mixture is filtered through celite filter aid and applied to a steel test panel. Baking the panel at 190° C. for ½ hour gives a coating with the following properties:

Sward hardness—66
Forward impact—passes 120 in. lb.
Reverse impact—passes 120 in. lb.
Mandrel—passes ⅛ in.

EXAMPLE XXII

Multron R-12 (polyester with hydroxyl number 158–175) is used in place of Multron R-2. All other variables are identical to Example XXI. The resulting coating has the following properties:

Sward hardness—6-8
Forward impact—passes 120 in. lb.
Reverse impact—passes 120 in. lb.
Mandrel—passes ⅛ in.

EXAMPLE XXIII

Multron R-18 (polyester with hydroxyl number 57–63) is used in place of Multron R-2. All other variables again are identical to Example XXI. The resulting coating has the following properties:

Sward hardness—2
Forward impact—passes 120 in. lb.
Reverse impact—passes 120 in. lb.
Mandrel—passes ⅛ in. lb.

EXAMPLE XXIV 4.50 g. of the product from Example I is dissolved in 9.0 g. of cresol at 70° C. 3.0 g. of Multron R-2 dissolved in 3.0 g. of Cellosolve is then added. The solution is filtered through medium porosity sintered glass and applied to a steel test panel. Baking the panel at 190° C. for ½ hour in a forced air oven gives a coating with the following properties:

Sward hardness—78
Forward impact—passes 120 in. lb.
Reverse impact—passes 120 in. lb.
Mandrel—passes ⅛ in. lb.

What is claimed is:

1. A process for producing polyurethanes and urethanes containing isocyanurate groups having molecular weights of at least about 200, said process comprising the reaction of organic polyhalides selected from the group consisting of alkylene, aralkylene, and alkenylene polyhalides containing from 2 to about 40 halogen atoms per molecule with a cyanate having the formula MOCN wherein M is selected from the group consisting of Li, Na, K, Rb, Cs, Ag, Pb, pyridinium, or tetraalkyl ammonium radicals, in the presence of a monohydric secondary or tertiary alcohol and an aprotic solvent and recovery of the polyurethanes thus formed, wherein the reaction occurs at a temperature of from about 25 to about 250° C. and wherein from 10 to about 100 moles of solvent, from 0.1 to about 20 moles of alcohol, and from 1 to about 5 moles of cyanate are present for each mole of halide contained in the organic polyhalide in the reaction mixture.

2. The process of claim 1 wherein the reaction is conducted in the presence of from 0.1 to about 30 mole percent based on the replaceable halogen of the polyhalide in the starting material of an organo-tin catalyst.

3. The process of claim 2 wherein the reaction is conducted in the presence of from about 10 to about 100 moles of solvent and from about 1 to about 20 moles of alcohol and from about 1 to about 4 moles of cyanate are present for each mole of halide contained in the organic polyhalide in the reaction mixture.

4. The process of claim 3 wherein the catalyst is present in amounts of from about 0.5 to about 10 mole percent based on the replaceable halogen of the polyhalide in the starting material.

5. The process of claim 1 wherein the polyhalide containing polyvalent group is selected from the class consisting of:

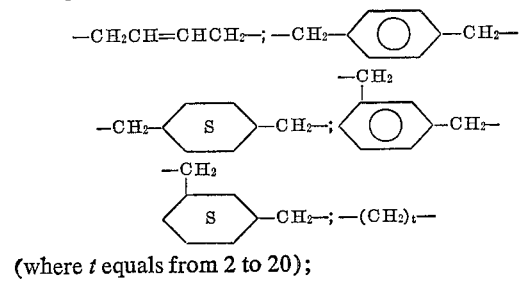

(where *t* equals from 2 to 20);

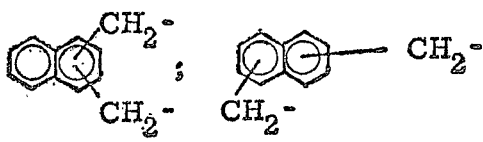

6. The process of claim 5 wherein the dihalide is a dichloride.

7. The process of claim 5 wherein the dihalide is a dibromide.

8. The process of claim 5 wherein the dihalide is a diiodide.

9. The process of claim 1 wherein the monohydric alcohol is selected from the group consisting of tert-butyl, sec-butyl, isopropyl, tert-amyl, and iso-amyl.

10. The process of claim 1 wherein the monohydric alcohol is tert-butyl alcohol.

11. The process of claim 1 wherein the monohydric alcohol is phenol.

12. The process of claim 1 wherein the polyhalide is an allylic or benxylic halide.

13. The process of reacting each mole of an organic halide having the structure $RX_2$ with from 2 to about 20 moles of an alcohol having the structure R'OH and with from 2 to about 10 moles of a cyanate having the formula MOCN wherein M is selected from the group consisting of Li, Na, K, Rb, Cs, Ag, Pb, pyridinium, or tetraalkyl ammonium radicals, in the presence of from 10 to 100 moles of aprotic solvent per mole of dihalide and at a temperature of from 25 to about 250° C. whereby isocyanurate-containing isocyanate based urethanes are produced and recovering the polyurethanes thus produced; wherein R is selected from the following radicals: alkylene, alkenylene, and aralkylene; and where R' is selected from the following radicals: alkyl, alkenyl, alkynyl, and aryl, wherein X is selected from the group consisting of Cl, Br, and I, and wherein the OH groups are secondary or tertiary.

14. The process of claim 13 wherein R is selected from the group consisting of:

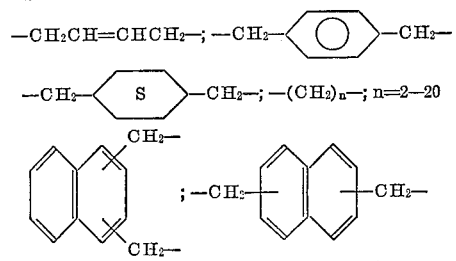

and where R' is selected from the group consisting of alkyl, alkenyl, alkynyl and aryl.

15. The process of claim 14 wherein R' is a monovalent radical derived from one of the following:

$(CH_3)_2CHOH$ $CH_3CH(OH)CH_2CH_3$, $(CH_3)_3COH$ $CH_3CH(OH)CH_2CH_2CH_3$ $(CH_3CH_2)_2CHOH$, and $(CH_3)_2C(OH)CH_2CH_3$ 16. The process of claim 13 conducted in the presence of an oragno tin catalyst selected from the group consisting of dibutyltin dilaurate, dibutyltin di-2-ethylhexoate, and dibultyltin diacetate.

17. The process of claim 16 in which the solvent is selected from the group consisting of dimethylformamide, N,N-dimethylacetamide, acetonitrile, N-methylpyrrolidone, hexamethylphosphoramide, dimethylsulfone, dimethylsulfoxide, and tetramethylurea.

18.

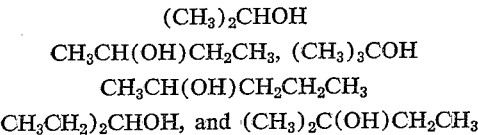

19.

References Cited

UNITED STATES PATENTS 3,306,926   2/1967   Neher et al. ———— 260—471

FOREIGN PATENTS 794,061   4/1968   Great Britain.

LORRAINE A. WEINBERGER, Primary Examiner

L. A. THAXTON, Assistant Examiner

U.S. Cl. X.R.

260—77.5, 468, 471, 479, 482

UNITED STATES PATENT OFFICE
CERTIFICATE OF CORRECTION

Patent No. 3,526,624　　　　　　　　Dated Sept. 1, 1970

Inventor(s) P. A. Argabright, B. L. Phillips, V. J. Sinkey

It is certified that error appears in the above-identified patent and that said Letters Patent are hereby corrected as shown below:

Col. 2, line 40: "halogen" should read --halogens--

Col. 4, line 60: "R' " should read --R"--

Col. 7, line 36: "p-xylene" should read --p-xylylene--

Col. 7, line 63: "isocyanaurate" should read --isocyanurate--

Col. 8, line at bottom of page, footnote 2　--2-- should be printed next "Electrical Resistance" heading in table Col. 9, line 12: "V" should read --XV--

Col. 9, line 56: "VIII" should read --XVIII--

Claim 5: Should read as follows:

--The process of claim 1 wherein the polyhalide containing polyvalent group is selected from the class consisting of:

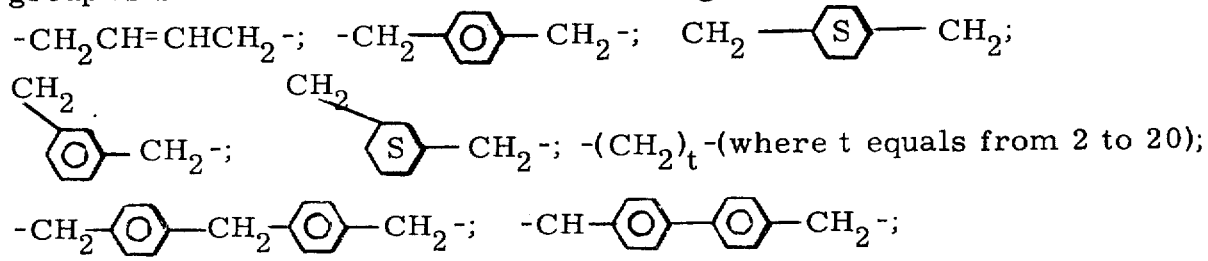

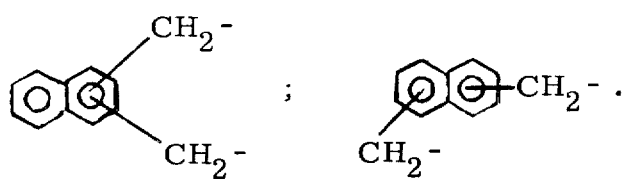

(Continued on following page)

Column 12, line 2, "benxylic" should read -- benzylic --.

Signed and sealed this 29th day of December 1970.

(SEAL)
Attest:

EDWARD M. FLETCHER, JR.
Attesting Officer

WILLIAM E. SCHUYLER, JR.
Commissioner of Patents